United States Patent [19]

Schmidt et al.

[11] Patent Number: 5,387,737
[45] Date of Patent: Feb. 7, 1995

[54] SLURRY INJECTION INTO DISAGGREGATED EARTH FORMATIONS

[75] Inventors: Joseph H. Schmidt; Michael L. Bill, both of Anchorage, Ak.; Ahmed S. Abou-Sayed, Sugarland, Tex.

[73] Assignee: Atlantic Richfield Company, Los Angeles, Calif.

[21] Appl. No.: 43,323

[22] Filed: Apr. 6, 1993

[51] Int. Cl.⁶ .......................... A62D 3/00; B09B 3/00
[52] U.S. Cl. .................... 588/250; 166/305.1; 175/66; 175/206; 405/53; 405/128
[58] Field of Search .............. 405/128, 129, 52, 53, 405/58, 59; 166/305.1, 308; 175/66, 206

[56] References Cited

U.S. PATENT DOCUMENTS

| | | | |
|---|---|---|---|
| 2,880,587 | 4/1959 | Hendrix et al. | 405/58 |
| 3,108,439 | 10/1963 | Reynolds et al. | 405/128 |
| 3,292,693 | 12/1966 | Hill et al. | 405/128 X |
| 3,374,633 | 3/1968 | Brandt | 405/58 |
| 4,387,770 | 6/1983 | Hill | 166/305.1 |
| 4,846,981 | 7/1989 | Brost | 166/305.1 X |
| 4,919,822 | 4/1990 | Boulanger | 405/59 X |

FOREIGN PATENT DOCUMENTS 233971 6/1961 Australia ................ 405/58

*Primary Examiner*—Dennis L. Taylor
*Attorney, Agent, or Firm*—Michael E. Martin

[57] ABSTRACT

Slurries of particulate solids wastes are injected into a disaggregated earth formation through an injection well by predetermining the formation to have a compressive stress in a range of about 300 psi to 2500 psi, a porosity of at least about twenty percent (20%) and disposed between overburden and underburden layers which have a substantially lower permeability than the disposal zone. The disposal zone is disaggregated or "liquified" by injecting substantially solids-free liquid followed by injection of the solids-laden slurry.

11 Claims, 1 Drawing Sheet

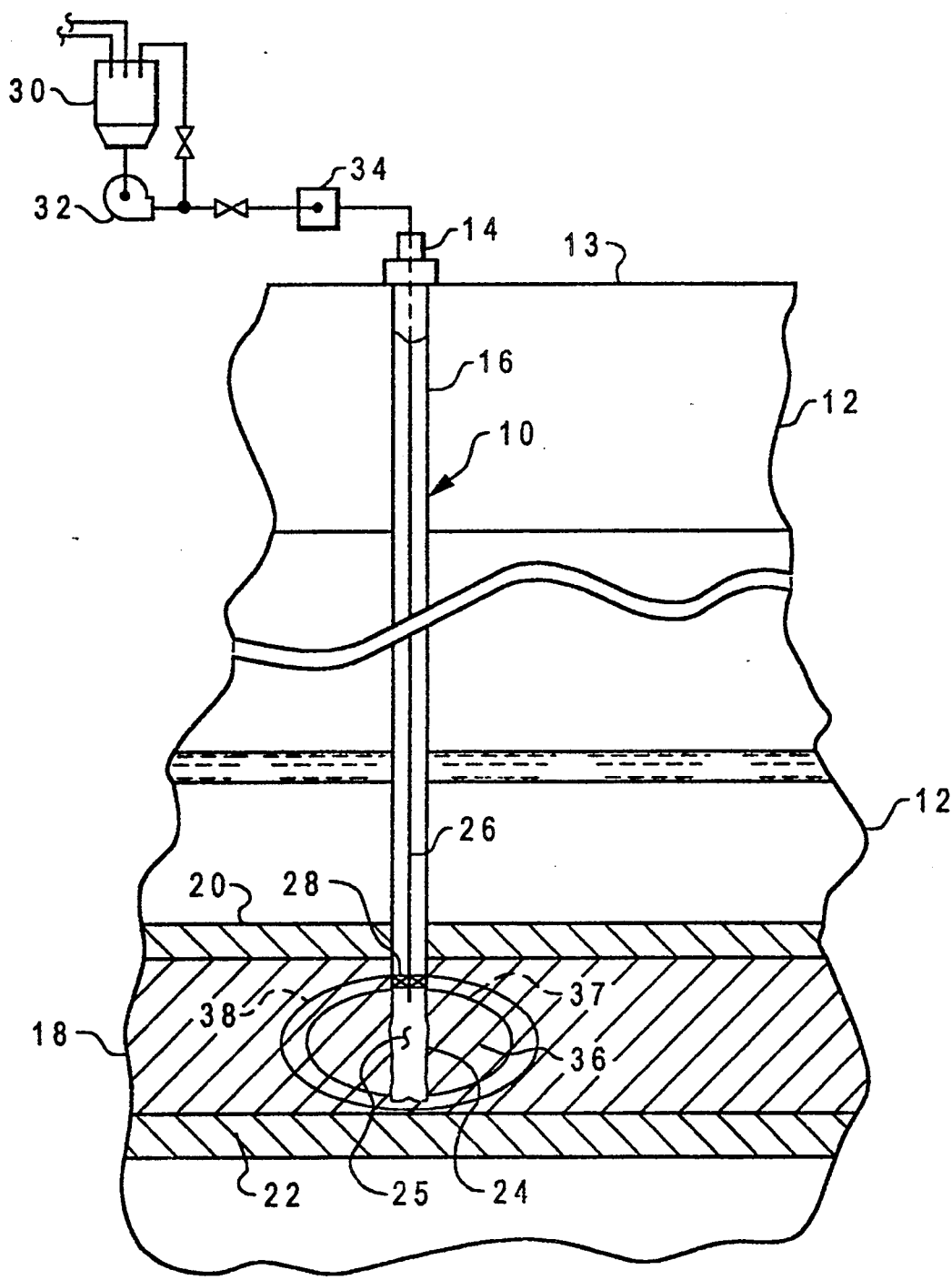

5,387,737

SLURRY INJECTION INTO DISAGGREGATED EARTH FORMATIONS

BACKGROUND OF THE INVENTION

1. Field of the Invention

The present invention pertains to a method of solids waste disposal by injecting slurries of particulate solids into subterranean formations through disposal wells by disaggregating the formation to accommodate a relatively large volume of such solids.

2. Background

The disposal of certain solids materials including earth materials such as drill cuttings and the like continues to be a vexing problem. Certain methods for disposing of slurries of particulate solids nave been proposed, including the methods described in U.S. patent application Ser. No. 07/910,381, filed Jul. 8, 1992 to Thomas K. Perkins, and U.S. Pat. No. 5,314,265 issued May 24, 1994 to Thomas K. Perkins, et al, both assigned to Atlantic Richfield Company. The methods described in the above-mentioned patent applications take into consideration that an earth formation may be hydraulically fractured and the fracture extended radially away from a wellbore and wherein the fracture serves as a storage space for particulate solids while the slurry carrier liquid leaks off through the fracture into the formation itself. Generally, the amount of solids material that may be disposed of in this manner is somewhat limited by the ability to extend the hydraulic fracture and to prevent premature build-up of a "filter cake" or the solids materials on the fracture faces which eventually prevents further injection of the disposal slurry. The techniques described in the above-mentioned applications deal with this problem. However, the formation characteristics of which the inventions described in these applications take advantage are not always available at disposal sites and the cost of transporting the material to be disposed of to preferred sites can be prohibitive.

Certain subterranean formations which have relatively low compressive stresses and sufficient porosity may not actually undergo the classic hydraulic fracture phenomena when fluids are injected under high pressure into such formations. In this regard, the present invention provides a method for disposing of relatively large volumes of slurried particulate solids wastes in formations which are relatively porous wherein the porosity of the formation may be taken advantage of in order to dispose of larger amounts of solids materials than may be disposed of by creating conventional hydraulically induced fractures.

SUMMARY OF THE INVENTION

The present invention provides an improved method of disposing of particulate solids in a subterranean formation by utilizing formation porosity and a phenomenon which may be characterized as liquefaction of the formation disposal zone to accommodate relatively large volumes of solids particles conveyed into the disposal zone in a slurry.

In accordance with one important aspect of the present invention, an earth formation disposal zone is selected which has a relatively low compressive strength, and a relatively high porosity and wherein a formation disposal zone is intercepted by a disposal well through which a fluid is injected to liquify or fluidize the disposal zone in the vicinity of the well followed by injection of a slurry of solids particles into the disposal zone. The steps of injecting a solids-free fluid followed by injection of a solids-laden fluid into the disposal zone may be repeated to extend the disposal zone and accommodate a larger volume of solids.

In accordance with another aspect of the present invention, a method of disposing of slurries of solids particles into a disposal zone in an earth formation carried out by selecting a zone having a compressive strength in the range of about 300 psi to about 2500 psi, a permeability of up to about 0.50 to 1.5 darcies and a porosity preferably at least about twenty percent (20%). The disposal zone is preferably "liquified" by injection of a predetermined quantity of substantially solids-free liquid, such as sea water, followed by injection of a solids-laden liquid having particle sizes which are, preferably, larger or smaller than the nominal particle size of the formation disposal zone. In this way, the slurried particles can mix with the particles in the liquified disposal zone and result in a "repacking" of the mixed solids to reduce the porosity of the disposal zone and to provide a repository for the slurried particles.

In accordance with yet a further aspect of the present invention, a method is provided for disposing of slurries of solid particles in a subterranean formation wherein a disposal zone is selected which is bounded by overburden and underburden zones which have a permeability less than the disposal zone to limit the liquified or fluidized area for disposal.

Those skilled in the art will recognize the above-described advantages and superior features of the present invention together with other important aspects thereof upon reading the detailed description which follows in conjunction with the drawing.

BRIEF DESCRIPTION OF THE DRAWING

The drawing FIGURE illustrates, in schematic form, an exemplary disposal well for disposing of slurries of solid particles in accordance with the method of the present invention.

DESCRIPTION OF PREFERRED EMBODIMENTS

Solids waste materials comprising relatively small particles of earth materials which have been produced during the drilling of wells and other excavation processes and certain other solids may be injected into earth formations from which these materials will not migrate into areas of producible water, for example. The above-mentioned patent applications describe techniques wherein hydraulic fractures are propagated away from an injection well and these fractures are filled with a slurry of relatively finely ground solids particles whereby the liquid is allowed to leak off through the fracture faces and the solids are retained in the fracture spaces. It is contemplated that certain formations at depths wherein the compressive stresses are not significant, or wherein the strength of the rock material is relatively low, may be subjected to a different technique to effect disposal of relatively large volumes of solids materials conveyed into the formation in the form of a slurry. It has been observed that in relatively "soft" earth formations, the injection of a substantially solids-free liquid into the formation through a well will cause the formation material to become somewhat "liquified". Somewhat dendritic fractures may also occur in this type of rock extending from the interception of the rock formation by the injection well.

In accordance with the present invention, an improved method of disposing of particulate solids, including earth particles and the like, may be carried out by taking advantage of the liquefaction of so-called soft or low strength earth formation. The formation permeability must be sufficient to allow the liquefying fluid to internally pressurize the formation pore spaces to take advantage of the formation's relative weakness in tension compared to its compressive strength. Once this "liquefaction" occurs, a solids-laden fluid may be injected into the liquified formation to "finger" through the formation and mix with the formation material. The actual solids waste disposal mechanism is realized by a "repacking" of the mixed solids, that is the injected solids and the formation particles. One way of visualizing this process is to contemplate the mixing of a quantity of golf balls with a quantity of shot particles or "BB's". The result is a lower mixture porosity than the porosity of a quantity of the individual components. In other words, the porosity of two different sized particles could be identical; however, the porosity of the mixed particles would be less than the individual segregated materials.

The present invention contemplates that a process may be carried out wherein a subterranean disposal zone is identified which is located between two relatively impermeable zones so that the materials injected into the disposal zone are substantially confined to the disposal zone. Unlike the boundaries to a disposal zone required for inventions wherein hydraulic fracturing takes place, the boundary zones for a disposal zone in accordance with the present invention do not necessarily require as much contrast between compressive stresses. Unlike the build-up of so-called solids filter cake which occurs in injection processes where the slurry liquid leaks off through hydraulic fracture faces, the method of the present invention contemplates that with a range of formation properties desired, the injected slurry of solids particles will finger through the so-called liquified formation zone without forming the filter cake. This may be enhanced by alternating the step of injecting a quantity of a substantially solids-free liquid with the step of injecting solids-laden liquids during a disposal process.

The drawing FIGURE illustrates a schematic of one embodiment of an injection well penetrating an earth formation for carrying out one preferred embodiment of the method of the present invention. An injection well 10 is shown penetrating an earth formation 12 from the earth's surface 13 at which is disposed a conventional wellhead 14 with a conventional casing 16 depending therefrom. The injection well 10 penetrates into a formation zone which has been identified as a desired disposal zone in accordance with the present invention and which is designated by the numeral 18. The disposal zone 18 is preferably bounded by an overburden zone 20 and an underburden zone 22 which have permeabilities substantially less than the permeability of the material in the disposal zone 18. Permeabilities of the zones 20 and 22 should preferably be on the order of 1% or less of the permeability of the zone 18, for example. The well 10 is shown to be completed in a so-called open hole condition, that is with an uncased wellbore portion 24 penetrating a substantial portion of the disposal zone 18. A conventional tubing string 26 extends through the injection well 10 and a conventional packer 28 is interposed in the well and forms a seal to prevent flow of fluid through the well except in the open hole wellbore space 25. It is contemplated that, in accordance with the method of the present invention, the disposal zone may also be penetrated by a cased portion of the well and communication between the wellbore and the disposal zone established by conventional perforations formed in such casing. In this way, multiple disposal zones may be utilized or nave materials injected thereinto in accordance with the present invention. The zone 18 may also be one which is exposed to an annular area of a completed production or disposal well.

The disposal zone 18 preferably has a low compressive strength, up to about 2500 psi and, in particular, not more than about 600 psi. Permeabilities of the disposal zone 18 may vary but preferably are as high as 0.50 to 1.50 darcies. Such disposal zones are normally found at formation total depths of less than about 6000 feet below the surface 13. The porosity of the disposal zone may vary but preferably is at least about twenty percent (20%) or more.

A method of injecting a slurry of solids-laden liquid as a way of disposing of particulate solids may be carried out in accordance with the invention by preparing a slurry in accordance with the teaching of U.S. Pat. No. 5,109,933, issued May 5, 1992 to James E. Jackson and assigned to Atlantic Richfield Company. This slurry preparation may be carried out by mixing a carrier liquid with particulate solids in a storage and recirculating tank 30 which is in communication with a particle size reducing device such as a centrifugal pump 32. When a suitable slurry of water and relatively fine solids particles has been mixed and the particle size reduced to the prescribed size range, the slurry may be injected through the tubing string 26 by way of a high pressure pump 34 into the space 25 for disposal in a "liquified" region 36 of the disposal zone 18. The liquified region 36 may take the form of an oblate spheroid as indicated by the boundary line 37 in drawing FIGURE, which boundary line may grow radially outwardly from the wellbore portion 24, indicated by the boundary line 38, as more slurry and liquefaction fluid are alternately injected into the wellbore.

The shape of the disposal zone 18 with respect to the wellbore 24 may be irregular and may include several hydraulic fractures having a somewhat dendritic or arborescent configuration. Still further, the boundaries 37 and 38 may be those which define a vertical two-winged fracture or a somewhat dendritic fracture field whereby the formation material is subject to the liquefaction process for a certain distance within the formation material away from the fracture faces. In all events, once the so-called liquefaction takes place, it is possible for the liquified formation sands and the injected solids to mix. The final porosity of the mixed material will typically be somewhat lower than the initial porosity of the formation material. This reduction in mixture porosity is the result pumped slurried solids being placed in the pore spaces the formation. This action will occur even though particle sizes of the injected solids would not be small enough to pass through the pore throats of an otherwise competent or consolidated formation.

Prior to selecting a disposal zone for injection of a slurry of liquid, such as seawater, and particulate solids, such as well drill cuttings, a disposal zone is analyzed as to its properties by conventional core or log analysis to determine whether or not it has sufficient porosity, compressive strength and permeability and, of course, whether or not it is bounded by formation zones which have lower permeability. The expected particle size of the disaggregated formation material in the disposal zone may also be analyzed so that the final particle sizes of the injected slurry may be selected. When the disposal zone, such as the zone 18, is defined and the injection well completed, the method of the invention may be initiated by carrying out a high pressure breakdown of the formation disposal zone adjacent the wellbore portion 24 if the well 10 is an open hole completion. If the well 10 is cased in the disposal zone 18, a perforation and breakdown process may be carried out.

One preferred method of maximizing near wellbore disaggregation and liquefaction may be carried out using a method, as a preliminary step, which is described in U.S. patent application Ser. No. 07/874,159, filed Apr. 27, 1992 to Joseph H. Schmidt, et al and assigned to Atlantic Richfield Company. The method described in the Schmidt, et al application includes pressurizing the wellbore with gas or with liquid driven by gas by building up pressure behind a shear disk in the tubing string 26, for example, or in a cased wellbore portion adjacent the disposal zone. Formation breakdown is then carried out when the fluid is released into the formation at very high pressures by rupture of the shear disk, or when the casing adjacent the disposal zone is perforated in the instance of a cased well.

By way of example, it is expected that the disposal zone should be subject to liquefaction during such a breakdown treatment for a distance of up to 50 feet from the wellbore where formation compressive strengths do not exceed 600 psi. Once formation breakdown has been initiated a substantial quantity of solids-free liquid is preferably injected at a rate of about 30 bpm (barrels per minute) 45 bpm (42 U.S. gallons per barrel) at a temperature about 35° F. to 45° F. Injecting fluids at a relatively low temperature will reduce in situ stresses resulting in wider fractures, if such fractures occur during the liquefaction process. The initial liquefaction process may be carried out using, typically, a quantity of about 15,000 barrels of substantially solids-free liquid, such as seawater. The particle size of the injected solids may be as great as 400 microns depending on the porosity and compressive strength of the formation material.

After liquefaction of the disposal zone for the exemplary treatment or process, injection of a slurry of solids particles in water, together with suitable dispersants, if necessary, is carried out. If the well indicates a possible "screening out" of solids fines against the formation fracture faces or boundary, a coiled tubing unit may be inserted into the wellbore through the tubing string 26 and a cleanout process carried out to remove solids-laden fluid from the wellbore space 25. At this point another 15,000 barrels of solids-free liquid, such at seawater, may be injected followed by repeating the injection of the solids-laden slurry. These steps may be repeated until additional solids injection into the formation zone appears to be precluded.

Once a formation disposal zone is full of injected solids and is to be abandoned, the process may be repeated uphole by placing a cement plug in the well at the top of the disposal zone and disposed on a sand plug, for example.

Although a preferred method of disposing of particulate solids wastes has been described in accordance with the present invention, those skilled in the art will recognize that certain substitutions and modifications may be made to the method described herein without departing from the scope and spirit of the invention as recited in the appended claims.

What is claimed is:

1. A method of disposing of particulate solids in a subterranean formation comprising the steps of:

injecting a quantity of substantially solids-free liquid into a predetermined disposal zone in said formation through an injection well penetrating said disposal, zone, said disposal zone having a predetermined porosity of at least about twenty percent (20%) and wherein the injection of solids-free liquid disaggregates at least a part of said disposal zone; and injecting a slurry of particulate solids into said disaggregated part of said disposal zone to place said particulate solids in the pore spaces of said disaggregated part of said disposal zone.

2. The method set forth in claim 1 wherein:
the particle size of the aggregate in said disposal zone is different from the particle size of the particulate solids in said slurry.

3. The method set forth in claim 1 wherein:
the compressive strength of said formation in said disposal zone is less than about 2500 psi.

4. The method set forth in claim 3 wherein:
the compressive strength of said formation said disposal zone is not more than about 600 psi.

5. The method set forth in claim 1 wherein:
said disposal zone has a predetermined permeability and is disposed between an overburden zone and an underburden zone and wherein said overburden zone and said underburden zone have permeabilities less than the permeability of said disposal zone.

6. The method set forth in claim 5 wherein:
the permeability of at least one of said overburden zone and said underburden zone is about 1% or less of the permeability of said disposal zone.

7. The method set forth in claim 1 including the steps of:
repeating the injection of solids-free liquid and slurry in successive steps.

8. The method set forth in claim 1 wherein:
said liquid and said slurry are injected into said disposal zone at a temperature of about 35° F. to 45° F.

9. The method set forth in claim 1 wherein:
the step of disaggregating said disposal zone includes initially penetrating said disposal zone with fluid which is driven into said disposal zone by pressure gas to effect disaggregation of the material in said disposal zone.

10. The method set forth in claim 1 wherein:
the particle size of said particulate solids is limited to about 400 microns maximum.

11. A method of disposing of particulate solids in a subterranean formation comprising the steps of:

defining a disposal zone in said formation having a predetermined porosity of at least about twenty percent (20%) and being capable of one of disaggregation and liquefaction by injection of liquid thereinto;

preparing a slurry of particulate solids having particle sizes different from the particles of said disposal zone; and injecting said slurry into said disposal zone through an injection well extending to said disposal zone to liquify said disposal zone and place said particulate solids in said disposal zone.

* * * * *